United States Patent [19]
Imamura et al.

[11] Patent Number: 5,656,104
[45] Date of Patent: Aug. 12, 1997

[54] METAL MOLD FOR GLASS FORMING

[75] Inventors: Hiroto Imamura, Kitakyushu; Michio Endo; Syoichi Sekiguchi, both of Kawasaki; Shigeki Ogura, Kitakyushu; Isao Arikata, Kitakyushu; Mitsuji Hirata, Kitakyushu; Koji Akafuji, Kitakyushu; Hirokazu Taniguchi, Tokai; Toru Ono, Kawasaki, all of Japan

[73] Assignee: Nippon Steel Corporation, Tokyo-to, Japan

[21] Appl. No.: 479,806

[22] Filed: Jun. 7, 1995

[30] Foreign Application Priority Data

| Oct. 14, 1994 | [JP] | Japan | 6-249693 |
| Feb. 10, 1995 | [JP] | Japan | 7-03068 |
| Mar. 28, 1995 | [JP] | Japan | 7-070109 |

[51] Int. Cl.⁶ ............... C23C 8/62; C03B 11/00
[52] U.S. Cl. ............ 148/325; 148/331; 148/332; 148/333; 148/435; 148/442; 420/40; 420/91; 420/112; 420/486; 420/582
[58] Field of Search ............ 148/325, 331, 148/332, 333, 435, 442; 420/40, 91, 112, 486, 582

[56] References Cited

FOREIGN PATENT DOCUMENTS

| 57-56339 | 4/1982 | Japan . |
| 63-156020 | 6/1988 | Japan . |
| 1-73034 | 3/1989 | Japan . |
| 6-10079 | 1/1994 | Japan . |
| 6-158269 | 6/1994 | Japan . |
| 6-279944 | 10/1994 | Japan . |
| 594057 | 12/1977 | Switzerland . |

*Primary Examiner*—Sikyin Ip
*Attorney, Agent, or Firm*—Cushman Darby & Cushman, IP Group of Pillsbury Madison & Sutro, LLP

[57] ABSTRACT

The present invention aims to provide a metal mold for glass, which needs not apply any swab in molding of glass, enabling no-swabbing glass forming. The alloy for the mold comprises by weight Cu: 10 to 80%, Al: 4 to 11%, Cr: 3 to 16%, Ni: 2 to 36%, and at least one rare earth element: 0.02 to 2.08 with the balance consisting of Fe and further comprises at least one member selected from the group consisting of Ti: Al %×0.5 to 2, V: Al %×0.2 to 1, Zr: Al %×0.1 to 0.3, and Nb: Al %×0.1 to 0.3. The alloy is gradually cooled from the solidification initiation temperature to 500° C. at a cooling rate of 10° C./min. The surface of the mold is coated with an Al-containing coating or roughened to an average roughness of 0.3 to 5 μm. A solid lubricating film is provided in a fitting portion of the mold, or alternatively a self-lubricating solid is embedded in the fitting portion of the mold.

2 Claims, 6 Drawing Sheets

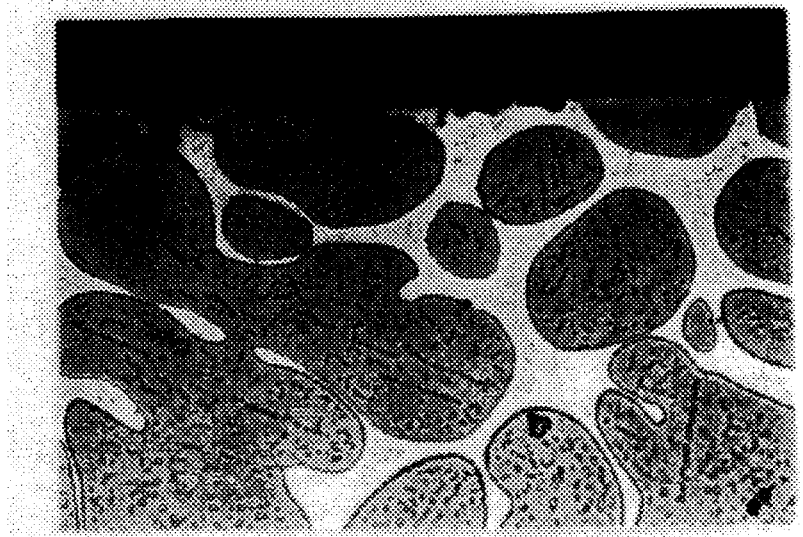
MAGNIFICATION: x 500
SURFACE ROUGHENING OF COMPARATIVE MATERIAL AFTER USE
F I G. 1
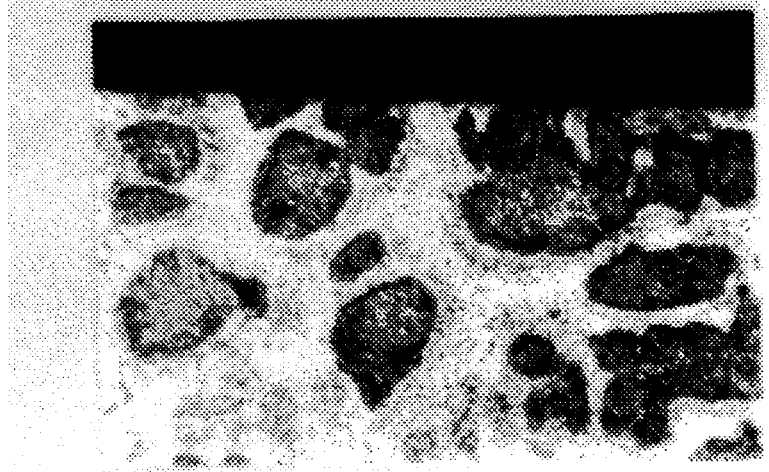
MAGNIFICATION: x 500
SURFACE OF ALLOY OF INVENTION AFTER USE
F I G. 2

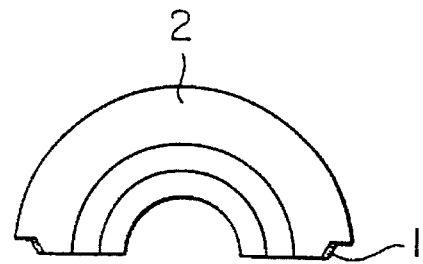
F I G. 7C
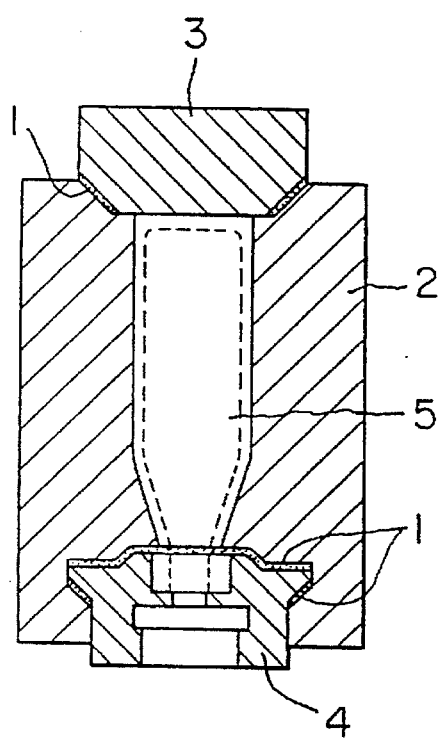
F I G. 7A
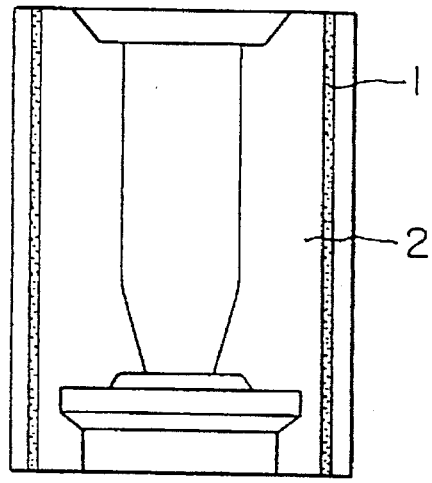
F I G. 7B

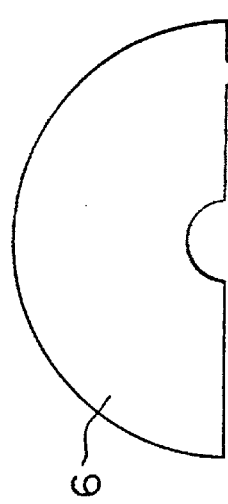
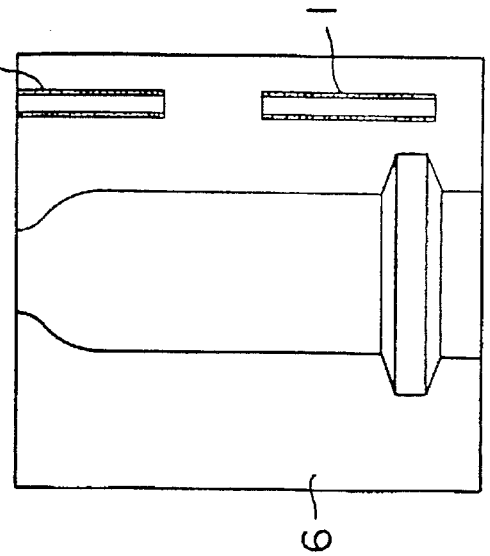
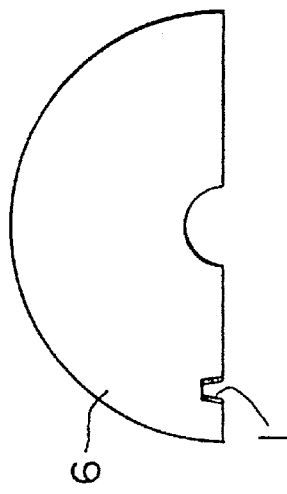
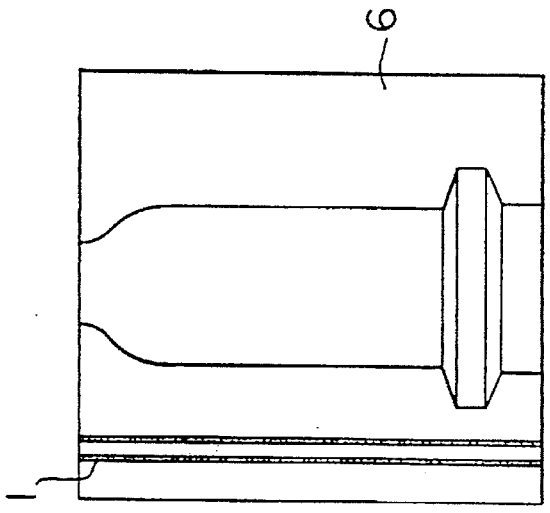
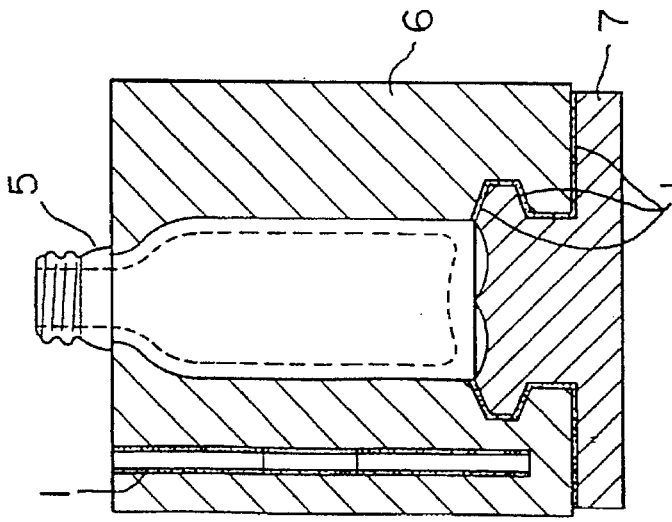

METAL MOLD FOR GLASS FORMING

BACKGROUND OF THE INVENTION

The present invention relates to a metal mold for glass forming wherein molten glass is placed into a metal mold and then molded into a glass product. More particularly, the present invention relates to no-swabbing metal mold having excellent high-temperature strength and releasability.

Metal molds for glass forming are generally made of cast iron or heat-resisting steel. In the metal molds made of these materials, when molten glass of a high temperature is placed into the metal mold and comes into contact with the mold surface, unfavorable phenomena occur such as deposition of an oxide on the surface of the glass, deterioration of the releasability of the glass from the mold due to high adhesion between the mold surface and the glass, and formation of fine irregularities, called "surface toughening," on the surface of the glass.

For this reason, in the prior art, it was common practice to apply a release agent composed mainly of graphite or sulfur onto the surface of a metal mold for glass. This oil-based release agent, however, should be manually applied at regular intervals, i.e., several times per hour. Further, it burns to deteriorate working environment. Furthermore, deposition of a graphite powder onto the surface of the glass product is unavoidable, resulting in deteriorated quality of the glass product. This has led to a strong desire for no-swabbing mold not requiring the use of any swab.

In order to solve these problems, the formation of a sprayed coating of tungsten or a deposited coating of TiN or the like on the surface of a base material, such as cast iron or heat-resisting steel, has been proposed in the art (Japanese Patent Laid-Open Nos. 56339/1982 and 156020/1988). In these proposals, a metallic layer for accelerating the release of the glass from the metal mold is separately applied after the production of the metal mold, and the production facilities, provision of additional production steps, and necessity of again forming the mold due to damage to the surface thereof increase the mold cost. In addition, the releasability is not satisfactory yet, thus making it impossible to realize no-swabbing mold which is free from maintenance with respect to the application of any lubricating/ swab.

The present inventors have filed an application of an invention relating to a material, for high-temperature use, having excellent resistance to oxidation at high temperatures (Japanese Patent Laid-Open No. 73034/1989). This alloy material has excellent resistance to oxidation in an oxidizing atmosphere at high temperatures. However, when it comes into contact with glass having a high temperature above 1000° C. or when it is used as a glass mold, which undergoes thermal shock during glass forming, an alumina film as an oxide film is partially peeled off, rendering the releasability unsatisfactory.

Thereafter, the present inventors filed an application of an invention relating to an alloy for no-swabbing glass mold which has a stable alumina film on the mold surface, a high coefficient of thermal conductivity, high hardness at high temperatures, and excellent corrosion resistance (Japanese Patent Laid-Open No. 10079/1994). Since, however, the structure of this alloy is composed mainly of a ferrite phase, the metal mold, due to lack of hardness at high temperatures, often causes abrasion loss and surface roughening by corrosion in the course of continuous operation for a long period of time. Further, heat treatment for forming an aluminum oxide film gives rise to the formation of a small amount of Cu oxide which deteriorates the wettability of the metal mold by the glass, often resulting in wrinkle defects on the surface of products at the time of glass forming. This requires the development of a further improved mold.

Furthermore, the present inventors succeeded in developing the so-called "no-swabbing molds" not requiring the use of any swab and filed applications of inventions relating to glass molds, having releasability enhanced by forming a very stable strong alumina film on the surface of the glass molds (Japanese Patent Laid-Open Nos. 158269/1994 and 279944/1994). The use of these alloy molds having excellent releasability without the application of any oil, however, caused galling in the contact area between parts of the mold, making it impossible to continue smooth molding operation and production of glass products with a good dimensional accuracy after occurrence of the galling. Consequently, the service life of these molds was equal to or shorter than that of the conventional metal molds.

The reason why galling occurs is as follows. In the conventional glass mold using an oil-based swab, the swab coated onto the surface of the mold flows out on the contact area between parts of the mold and consequently serves as a lubricating oil, thus preventing galling. On the other hand, in the case of the alloy mold, having excellent releasability of glass from the mold, disclosed in Japanese Patent Laid-Open Nos. 10079/1994, 158269/1994, and 279944/1994, since no oil-based swab is used, no lubricating component is fed to the contact area between parts of the mold, leading to galling which in turn shortens the service life of the mold.

The metal mold for glass forming is classified into a blank mold and a blow mold. Also in a mold of the conventional alloy, in the case of a blow mold, no swab is, in some cases, applied in order to avoid the deposition of a swab on the surface of a glass product. This causes galling in the contact area between the parts of the mold, resulting in shortened service life of the mold. The present inventors have made research and development also on a glass mold, with a stable aluminum oxide film formed on the mold surface and a novel method for lubricating the contact area between parts of a mold in a blow mold for glass wherein no swab is applied to the contact area between the mold and the glass.

SUMMARY OF THE INVENTION

An object of the present invention is to provide a metal mold for glass forming which can eliminate the need to coat any swab at the time of glass forming, enabling no-swabbing glass forming.

Another object of the present invention is to provide an alloy, for a mold for glass, which can satisfy property requirements for a glass mold, that is, (1) the coefficient of thermal conductivity is high with the coefficient of thermal expansion being low, (2) the high-temperature strength is high, (3) the heat resistance and the corrosion resistance are good, and (4) the wettability by glass and the releasability of glass from the mold are good.

A further object of the present invention is to provide a metal mold for glass forming, which can eliminate the need to coat a lubricating swab or a metallic layer for enhancing the releasability in the production of a glass product likely to cause cracking or wrinkle, enabling no-swabbing glass forming.

A further object of the present invention is to provide a glass mold which can prevent galling caused in the contact area between parts of a mold and has a self-lubricating property and a long service life even in operation without the application of any oil.

The present invention provides an alloy for a glass mold, characterized by comprising by weight Cu: 10 to 80%, Al: 4 to 11%, Cr: 3 to 16%, Ni: 2 to 36%, and at least one rare earth element: 0.02 to 2.0% with the balance consisting of Fe and unavoidable impurity elements. By this constitution, an aluminum film is formed on the surface of the mold, which increases the releasability of molten glass from the mold and, at the same time, increases the high-temperature strength, heat resistance, and corrosion resistance of the mold.

The present invention further provides an alloy for a glass mold, characterized by comprising a base alloy having the above composition and, added thereto, at least one member selected from the group consisting of Ti: Al %×0.5 to 2, V: Al %×0.2 to 1, Zr: Al %×0.1 to 0.3, and Nb: Al %×0.1 to 0.3. The addition of an element for forming an Al-base intermetallic compound results in crystallization or precipitation of a hard phase, enhancing the high-temperature strength of the mold.

The present invention further provides a process for producing an alloy for a glass mold, characterized by comprising the steps of: pouring a melt of the above alloy for a mold into a casting mold; and gradually cooling the molten alloy from the solidification initiation temperature to 500° C. at a cooling rate of not more than 10° C./min. The regulation of the cooling rate can increase the amount of the hard phase and enhance the high-temperature strength.

A further characteristic feature of the present invention resides in that a coating comprising a highly reductive material composed mainly of an Al powder or a material comprising the Al powder and a substance highly reactive with $Al_2O_3$ at a high temperature is previously coated on the surface of the mold used and the resultant coating is heat-treated in a high-temperature oxidizing atmosphere at a temperature of 700° C. or above to sufficiently diffuse Al. By virtue of the feature, the coating reacts, in a solid phase, with alumina in the internal oxide layer of the alloy to return the surface of the alloy to a sound state.

A further characteristic feature of the present invention resides in that in order to impart the heat insulating effect at the time of no-swabbing glass forming without use of any swab, the contact area between the mold and the glass is reduced by roughening the molding surface to an average roughness of 0.3 to 5 μm or providing a hole having a diameter of not more than 0.5 mm in the molding surface.

A further characteristic feature of the present invention resides in the application of a solid lubricating film, containing at lease one member selected from the group consisting of tungsten disulfide, molybdenum disulfide, boron nitride, and graphite, into the fitting portion of the mold or embedding of a self-lubricating solid material, instead of the above solid lubricating film, in a recess provided in the fitting portion of the metal mold.

BRIEF DESCRIPTION OF THE DRAWINGS

FIG. 1 is a photomicrograph of a metal structure of a comparative material showing surface roughening of the material by corrosion;

FIG. 2 is a photomicrograph of a metal structure of the alloy of the present invention showing the freedom from surface roughening after use;

FIG. 3 is an explanatory view showing the form of crystallization of an intermetallic compound in the alloy of the present invention, wherein

FIG. 7 is a diagram showing a mold, for glass, with a solid-lubricating film applied to the contact area between parts of a blank mold, wherein FIG. 7A is a front sectional view, FIG. 7B is a side view of a blank mold, and FIG. 7C is a top view of the blank mold;

FIG. 8 is diagram showing a glass mold, with a self-lubricating solid material embedded in the contact area between parts of a blank mold, wherein

FIG. 9 is a diagram showing a glass mold, with a solid-lubricating film applied to the contact area between parts of a blow mold, wherein FIG. 9A is a front sectional view, FIG. 9B is a side view of a blow mold, FIG. 9 C is a top view thereof, FIG. 9D is a side view of a blow mold, and FIG. 9E is a top view thereof.

DETAILED DESCRIPTION OF THE INVENTION

Figure 3A:
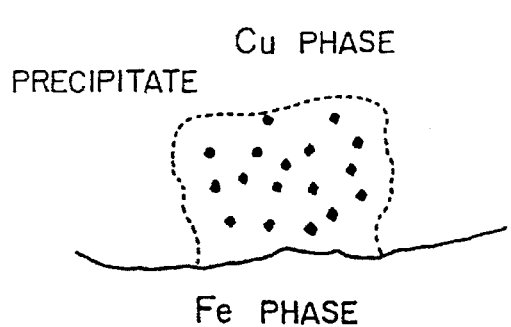
FIG. 3A shows crystallization in a finely dispersed state and FIG. 3B show massive crystallization in a mesh form.

A. Alloy for mold and production thereof

The present invention provides an alloy for a glass mold, characterized by comprising by weight Cu: 10 to 80%, Al: 4 to 11%, Cr: 3 to 16%, Ni: 2 to 36%, and at least one rare earth element: 0.02 to 2.0% with the balance consisting of Fe and unavoidable impurity elements.

The present invention further provides an alloy for a glass mold, characterized by comprising a base alloy having the above composition and, added thereto, at least one member selected from Ti: Al %×0.5 to 2, V: Al %×0.2 to 1, Zr: Al %×0.1 to 0.3, and Nb: Al %×0.1 to 0.3.

At the outset, glass forming using a glass mold will be described.

In the glass forming, molten glass of 1000° C. or above is cut off, introduced into a deflecter, placed into a mold at a high speed, and brought into close contact with the mold surface in the step of blowing or pressing to remove heat, thereby completing molding. That is, in the mold surface, particularly in the blank mold, the mold undergoes, besides a chemical reaction with the molten glass, mechanical and thermal shock at the time of introduction of the molten glass into the mold at a high speed. The swab serves to prevent the occurrence of a reaction between the molten glass and the mold surface and to improve the releasability of the glass from the mold. At the same time, it has the effect of lubrication and, further, the effect of cooling the mold and relaxing the thermal shock.

Therefore, as compared with the conventional mold used through the step of applying an oil, the no-swabbing mold should satisfy stricter requirements for materials. In particular, in no-swabbing operation, the molten glass comes into direct contact with the mold surface, so that the temperature of the mold surface unavoidably becomes higher. For this reason, it is important for the material to have strength high enough to withstand the repetition of mechanical shock at the time of introduction of the molten glass at a high speed into the mold, that is, it is important to ensure high-temperature strength. In particular, an alloy proposed, by the present inventors, for no-swabbing mold has a metallic structure comprising two separated phases, an Fe phase and a Cu phase. In this alloy, in addition to the strengthening of the Fe phase, the strengthening of the Cu phase which is more difficult than that of Fe phase is indispensable. Solid-solution or precipitation strengthening is generally considered effective in enhancing the strength of metals. However, when an enhancement in high-temperature hardness of the Cu phase without sacrificing the properties as the no-swabbing mold material is contemplated, the strengthening method is of course limited. For example, when elements, such as Al, Ti, and Ni, are dissolved alone in a solid solution form in Cu, the strength at a temperature of 500° C. or above is low although the strength at room temperature can be enhanced. On the other hand, elements precipitated in Cu, for example, Zr, Cr, Be, and P, by virtue Of interaction between fine precipitation and dislocation, has the effect of significantly strengthening the strength at room temperature, as in the case of solid-solution strengthening. They, however, have no effect at a temperature of 300° C. or above and cause redissolution in a solid solution form in Cu, resulting in lowered effect of increasing the strength.

The present inventors have made extensive and intensive studies and, as a result, have aimed at an intermetallic compound as a material, which causes neither dissolution in a solid solution form nor decomposition even at high temperatures, and, at the same time, can maintain high strength, rather than the above strengthening method. The intermetallic compound has very high hardness and, hence, is very brittle when used alone. The dispersion of the intermetallic compound in a suitable size in a material having excellent spreadability poses no problem of brittleness and should be effective in strengthening the phase.

Regarding a mold material, already proposed by the present inventors, containing Al as an element for self-producing an alumina film, the present inventors have made studies on the dispersion of a hard phase containing an Al-base intermetallic compound in the Cu phase by taking advantage of the Al. Although there are many kinds of Al-base intermetallic compounds, a selected element which combines with Al to form an intermetallic compound should not have any adverse effect on the formation or properties of an alumina film indispensable to the no-swabbing mold. Further, the present inventors have found that selected elements are different from each other in solubility in a solid solution form in the Cu phase in the temperature range of from the solidification point to 500° C. and are useful for increasing the high-temperature strength. The present inventors have further found elements which, despite the fact that they are insoluble in the Cu phase, can be dispersed and precipitated in the Cu phase.

The reason for the limitation of the composition of the alloy for a mold according to the present invention will now be described.

Cu is an element which determines the coefficient of thermal conductivity of the mold. The content thereof is determined by operating conditions in glass forming and the site where the mold is to be used. When the Cu content is less than 10%, the coefficient of thermal conductivity is so low that the provision of a cooling fin becomes necessary in order to prevent excessive overheating of the mold, resulting in increased cost. On the other hand, when it exceeds 80%, the hardness at a high temperature around 400° C., to which temperature the mold is usually exposed, is lowered, shortening the service life of the mold. For this reason, the Cu content is limited to 10 to 80%, preferably 20 to 60%.

Al is dissolved in a solid solution form in Fe and Cu phases in substantially the same proportion and forms an alumina film on the mold surface to serve as a swab and, at the same time, is the most important element which forms a hard phase including an intermetallic compound to enhance the high-temperature strength. An Al content of not less than 3% is necessary for forming, after the production of a mold, an alumina film on the surface of the mold by heating in an oxidizing atmosphere. When the Al content is up to 10% which is the upper limit of the amount of Al soluble in a solid solution form in the Cu phase, both the Fe phase and Cu phase are homogeneous and, at the same time, a dense film can be formed. However, when the Al content exceeds 11%, a βphase is crystallized in the Cu phase, rendering the structure very brittle. As described above, a part of Al added is consumed during casting to form a hard phase containing an intermetallic compound. For this reason, the lower limit of the Al content is 4% with the upper limit thereof being 11%.

Cr is an element which is dissolved in a solid solution form in the Fe phase alone and serves to enhance the corrosion resistance of the Fe phase and, at the same time, to enhance the high-temperature strength. Further, in the formation of an aluminum film on the Fe phase, Cr forms, in an early stage of heating, an Cr oxide film which has the effect of enhancing the adhesion of an aluminum oxide film formed after the formation of the Cr oxide film. When the Cr content is not more than 4%, the above effects cannot be attained. On the other hand, when it is not less than 20%, the effects are saturated.

Ni is a fundamental element which transforms an iron structure to an austenite phase and is also necessary for maintaining the high-temperature strength. The content of Ni required is 40% for an Fe—Cr—Ni alloy, and the Ni content may be selected in the range of from 2 to 36% depending upon the iron content.

Rare earth elements, such as Y, Ce, and La, has the effect of promoting the formation and stabilization of an aluminum oxide film, enhancing the peeling resistance of the aluminum oxide film, and preventing the film from being peeled by mechanical shock or the like. For this purpose, the content of the rare earth element should be not less than 0.02%. However, when it exceeds 2%, the thermal fatigue resistance of the mold is unfavorably deteriorated.

Ti is an element which is dissolved in a solid solution form in the Fe and Cu phases in a certain amount in the same proportion to form AlTi intermetallic compound, thereby enhancing the strength. AlTi is a compound wherein Al and Ti combine with each other in an Al:Ti ratio of 35 to 40:65 to 60. In an alloy comprising a mixture of Cu with Fe, only 15% of the total content of Al and Ti in the molten metal is crystallized. Therefore, when the Ti content is not more than 0.5 time the Al content, the amount of AlTi crystallized is so small that the effect of increasing the strength is small. On the other hand, when it is not less than 2 times, the effect of increasing the strength is saturated.

V is slightly dissolved in a solid solution form in the Cu phase to form $Al_3V$ intermetallic compound, thereby enhancing the strength. $Al_3V$ is a compound wherein Al and V combine with each other in an Al:V ratio of 75:25. The form of crystallization is different from that of Ni and Ti and precipitated in a mesh form. The mesh size does not depend upon the V content, the effect of strengthening the Cu phase is saturated by the addition of V in a smaller amount as compared with the addition of Ni and Ti. Specifically, the contemplated effect appears by adding V in an amount of 0.2 time the Al content. When the amount of V added is not less than 1 time, the amount of V precipitated in the Fe phase interface becomes large, rendering the alloy brittle.

Zr is an element which is dissolved in a solid solution form in the Fe phase alone and not substantially dissolved in a solid solution form in the Cu phase and serves to combine with Al to form $Al_3Zr$ intermetallic compound, thereby enhancing the strength. $Al_3Zr$ is a compound wherein Al and Zr combine with each other in an Al:Zr ratio of 47:53. The form of crystallization is different from that of Ni and Ti and crystallized in a mesh form in the Cu phase. In this case, the hard phase does not consist entirely of $Al_3Zr$ but comprises Zr in which Al has been dissolved in a solid solution form. Despite the fact that Zr can be dissolved in a solid solution form in the Fe phase, even when the amount of Zr added is very small, the proportion of Ze crystallized in the Cu phase is high. The contemplated effect can be attained when the amount of Zr added is not less than 0.1 time the Al content. When the amount of Zr crystallized is large, the alloy becomes remarkably brittle. For this reason, the upper limit of the amount of Zr added is 0.3 time the Al content.

Nb is an element which is dissolved in a solid solution form in a very small amount in the Fe phase and the Cu phase and, when added even in a very small amount, forms $Al_3Nb$ intermetallic compound, thereby enhancing the strength. $Al_3Nb$ is a compound wherein Al and Nb combine with each other in an Al:Nb ratio of 46:54. The form of crystallization is the same as in the case of Zr, and $Al_3Nb$ is coarsely crystallized in an island form in the Cu phase. Here again, as in the case of Zr, the crystallized hard phase does not consist entirely of $Al_3Nb$ but comprises Nb in which Al has been dissolved in a solid solution form. The contemplated effect can be attained when the amount of Nb added is not less than 0.1 time the Al content. When the amount of Nb crystallized is large, the alloy becomes remarkably brittle. For this reason, the upper limit of the amount of Nb added is 0.3 time the Al content.

Figure 3B:
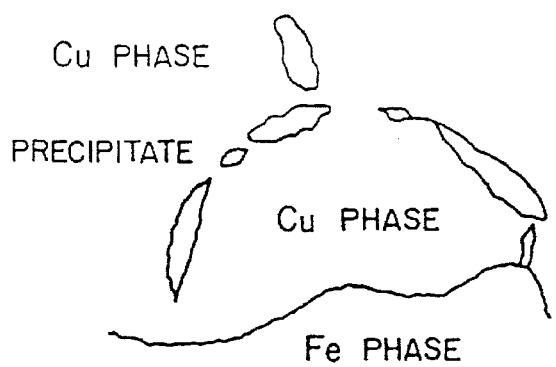

In the alloy for a mold according to the present invention, a crystallized phase or a precipitated phase, having high-temperature strength, containing an Al-base intermetallic compound prepared by a reaction with Al, is present, and the form of the phase varies depending upon additive elements. The form of the phase can be roughly classified into one having a finely dispersed region shown in FIG. 3A and one dispersed in a massive mesh form shown in FIG. 3B. Experiments revealed that, in addition to massive crystallized product, a finely crystallized region is useful for ensuring the high-temperature strength. Therefore, the hard phase was defined as being constituted by both the massive crystallized product and the finely crystallized region, and the percentage area of the hard phase was determined using a microscope. For example, when Ni is added, a finely dispersed and crystallized phase too appears as shown in FIG. 3A. On the other hand, the addition of Zr, in many cases, results in the crystallization of a somewhat large massive reaction product in a mesh form as shown in FIG. 3B. In order to avoid surface roughening of the mold in the stage of molding of glass, the Vickers hardness of the Cu at 400° C. is preferably not less than 120. For attaining this purpose, the hard phase should occupy at least 5%.

Further, the present invention provides a process for producing an alloy for a glass mold, characterized by comprising the steps of: pouring a melt of the above alloy for a mold into a casting mold; and gradually cooling the molten alloy from the solidification initiation temperature to 500° C. at a cooling rate of not more than 10° C./min.

The size of the glass mold varies depending upon the size of a bottle prepared. In general, a mold for a 1.8-liter bottle comes under the group of large molds. The size of the material for the blank mold is about 30 cm in diameter, and small molds include one, for a bottle for medicines, which is in a circular cylinder form having a diameter of 10 cm, a semi-circular cylinder form, or a near net shape mold close to the final mold. A neck ring, for use in molding of a thread in the bottle is smaller in size.

The present inventors have made casting using molds having various sizes to investigate the metal structure and hardness. As a result, it was found that when the alloy of the present invention was cast without regulating the cooling rate according to the prior art method, the amount of the crystallized hard phase including an Al-base intermetallic compound is large in the case of a large ingot size, whereas it is small in the case of a small ingot size. That is, a lower solidification and cooling rate after casting is important for further enhancing the amount of the crystallized hard phase.

Figure 4:
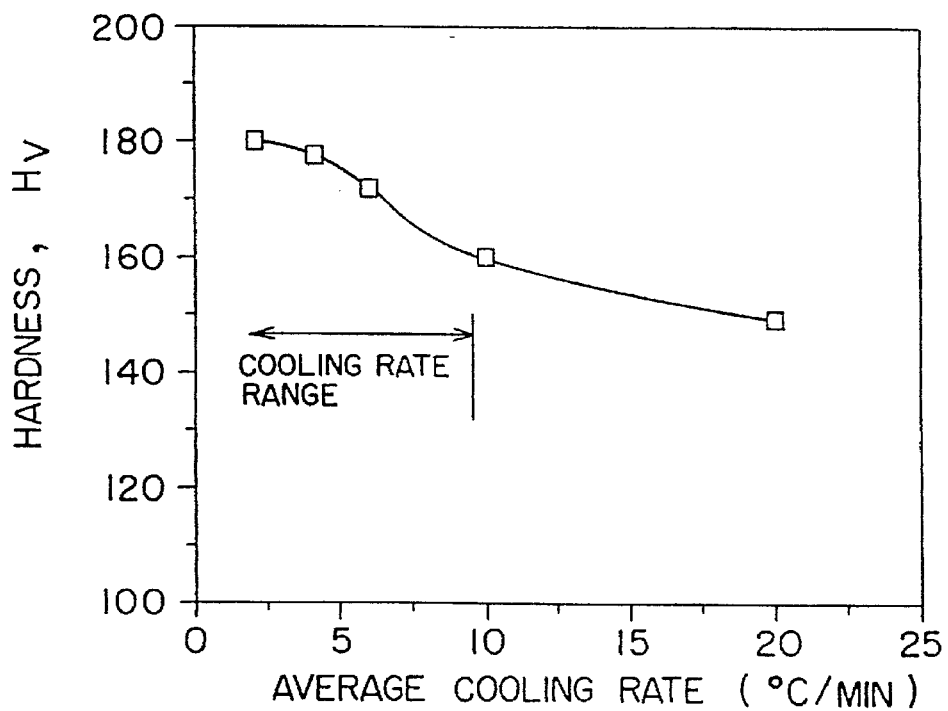
FIG. 4 is a diagram showing a correlation between the average rate of cooling of the alloy of the present invention from the solidification initiation temperature after casting and the hardness of Cu phase at 400° C.

One example of the results of detailed investigation of the cooling rate and the high-temperature hardness is shown in FIG. 4. Specifically, an alloy comprising by weight 34.0% of Cu, 7.0% of Al, 11.8% of Cr, 19.8% of Ni, 3.1% of V, 0.9% of Nb, 0.02% of La, and 0.03% of Ce was melted in a small melting furnace, the melt was solidified in a crucible while regulating the cooling rate of the melt after the initiation of solidification at 2° to 20° C./min to prepare an ingot from which a sample for the measurement of the hardness was taken off, the hardness at 400° C. was measured, and the results are shown in FIG. 4.

As is apparent from FIG. 4, an increase in hardness is observed when the cooling rate is not more than 10° C./min with the effect of increasing the hardness becoming the maximum when the cooling rate is not more than 5° C./min.

Figure 5:
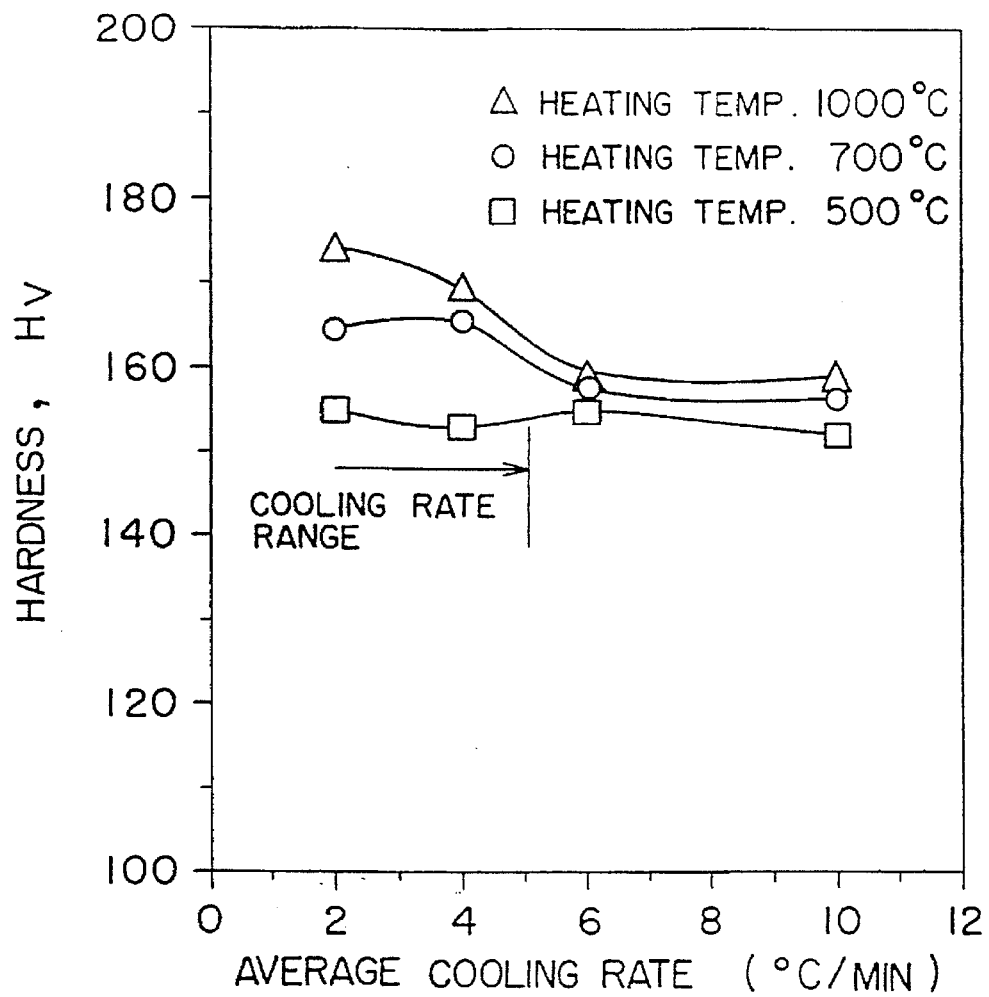
FIG. 5 is a diagram showing a correlation between the heat treatment temperature and cooling rate of the alloy of the present invention and the hardness of Cu phase at 400° C.

Increasing the high-temperature hardness by increasing the hard phase can be realized by heat treatment of the ingot, besides the regulation of the cooling rate during casting. The increase in the hard phase according to this heat treatment method is considered attributable to the precipitation of a new hard phase from within the solid phase and an increase in size of the hard phase containing the already crystallized intermetallic compound and the hard material per se. The hardness can be increased although the degree of increase in hardness is not larger than that attained by the regulation of the rate of cooling of the molten metal. The results are shown in FIG. 5. Specifically, the alloy having the above composition was reheated to 500° to 1000° C. and cooled at a rate of 2° to 10° C./min, and the hardness at 400° C. was measured. FIG. 5 shows that heat treatment under conditions of a heating temperature of 700° C. or above and a cooling rate of not more than 5° C./min can increase the high-temperature strength.

The present invention will now be described in more detail with reference to the following examples and comparative examples.

EXAMPLE A-1

10 samples were prepared from each of an alloy of the present invention and a comparative material (an alloy described in Japanese Patent Laid-Open No. 10079/1994) having compositions specified in Table 1 and treated at 700° C. for 8 hr to form a film.

TABLE 1

Chemical ingredients and hardness at 500° C.

| Examples | Chemical ingredients (wt %) | | | | | | Hardness at 500° C. (Hv) |
|---|---|---|---|---|---|---|---|
| | Cu | Cr | Al | Ni | La + Ce | Fe | |
| Alloy of invention | 50 | 12 | 7 | 17 | 0.05 | Balance | 175–190 |
| Comparative material | 50 | 8 | 7 | — | 0.05 | Balance | 90–100 |

High-temperature hardness in the temperature range of from room temperature to 1000° C. were measured on these samples. As a result, as shown in Table 1, the hardness of the alloy of the present invention at the temperature 500° C., the service temperature of a glass mold, was 1.8 times better than that of the comparative material.

Further, in order to determine the composition of the oxide film, the surface of the oxide film of these samples was analyzed by elementary analysis using GDS (glow discharge emission spectroscopic analyzer). As a result, as is apparent from Table 2, the alloy of the present invention had a markedly reduced Cu content and an increased Al content, indicating that a contemplated alumina film was formed as the oxide film.

TABLE 2

| Examples | Chemical composition of surface of oxide film (wt %) | | | | |
|---|---|---|---|---|---|
| | Cu | Cr | Al | Fe | O |
| Alloy of invention | 9–10 | 5–6 | 45–50 | 4–6 | 30–40 |
| Comparative material | 30–32 | 5–6 | 25–30 | 4–6 | 25–35 |

Then, the alloy of the present invention and the comparative material were used to produce molds, for bottles for drinks, which are particularly required to have wettability by glass because these bottles are likely to cause wrinkle or seam defects at the time of molding. These molds were used in an actual glass production line for comparison of performance. As a result, for the mold formed of the comparative material, when a glass material was placed in the mold, it could not smoothly slid into the mold, sporadically causing wrinkle or seam defects. This required the application of a lubricating/swab once per hour. By contrast, the mold formed of the alloy of the present invention exhibited good sliding of a glass material thereinto, caused neither wrinkle defect nor seam defect, did not require the application of a lubricating/swab at all in the course of continuous molding operation, and provided glass bottles having satisfactory surface quality and dimension requirements.

Further, in order to examine surface roughening by corrosion, a continuous molding test was carried out in an actual line for 30 days. As a result, about 7 days after the initiation of the continuous molding test, the comparative material caused surface roughening by corrosion of a Cu phase as shown in FIG. 1, whereas as shown in FIG. 2, the alloy of the present invention caused no surface roughening even 30 days after the initiation of the continuous molding test.

The alloy for a glass mold according to the present invention leads to the formation of no significant Cu oxide on the surface of the mold, has good wettability by glass, and can form a very stable strong aluminum oxide film. Further, by virtue of excellent high-temperature hardness and corrosion resistance, the mold formed of the alloy of the present invention, even in the case of continuous use for a long period of time, causes no deterioration in molding property, has excellent releasability from glass, and eliminates the need for the troublesome application of a lubricating/swab.

EXAMPLE A-2

An alloy of the present invention and an Fe—Cu—Al—Cr—base alloy (comparative material 1) were prepared in the form of an ingot having a diameter of 200 mm and a height of 300 mm by a melt process in an induction heater. The composition of each alloy and the percentage area of a hard phase calculated by taking advantage of microscopic observation are shown in Table 3. The ingots were cut from the bottom side in a height of 100 mm to prepare sample materials for the measurement of high-temperature hardness. The remaining portions, having a height of 200 mm, of the ingots and a commercially available cast iron material (FC 200) (comparative material 2), which had hitherto been used as a material for a mold for glass, were machined to prepare blank molds for glass bottles.

TABLE 3

| Sample No. | | Chemical composition (wt %) | | | | | | | | | | | Percentage of a hard phase (%) |
|---|---|---|---|---|---|---|---|---|---|---|---|---|---|
| | | Cu | Al | Cr | Ni | Ti | V | Zr | Nb | La | Ce | Fe | |
| Alloy of invention | 1 | 25.1 | 6.8 | 15.6 | 10.3 | — | — | — | — | — | — | Balance | 6.5 |
| | 2 | 26.0 | 7.5 | 18.3 | — | 4.1 | 2.3 | — | — | — | — | Balance | 5.2 |
| | 3 | 42.8 | 8.0 | 12.6 | 18.3 | — | — | 2.8 | 1.5 | — | — | Balance | 8.3 |
| | 4 | 40.9 | 8.5 | 12.3 | 22.7 | 6.2 | — | — | — | — | — | Balance | 10.5 |
| | 5 | 55.4 | 10.2 | 7.3 | — | 8.5 | 2.1 | 1.8 | — | — | — | Balance | 7.2 |
| | 6 | 56.8 | 10.8 | 8.5 | — | — | 4.9 | — | 2.5 | — | — | Balance | 6.1 |
| | 7 | 33.9 | 7.2 | 10.6 | 20.5 | — | 3.3 | — | 0.9 | — | — | Balance | 9.5 |
| | 8 | 34.0 | 7.0 | 11.8 | 19.8 | — | 3.1 | — | 0.9 | 0.02 | 0.03 | Balance | 9.1 |
| Comparative material | 1 | 50.5 | 7.0 | 12.6 | — | — | — | — | — | 0.03 | 0.03 | Balance | 0.0 |
| | 2 | C: 3.6 Si: 1.9 Mn: 0.5 Ni: 1.0 Cr: 0.5 Fe: Balance | | | | | | | | | | | 0.0 |

Blocks of 15 mm square×10 mm were taken off from sample materials for the measurement of the high-temperature hardness, subjected to mirror finishing, and measured for the Vickers hardness of the Cu phase portion with a high-temperature microhardness tester. The measurement was carried out under conditions of a load of 10 g and a temperature of 400° C. The results are given in Table 4.

As can be seen from Table 4, for all the alloys of the present invention, the hardness of the Cu phase portion is higher than that for the comparative materials, indicating that the softening resistance of the Cu phase portion at a high temperature was increased.

TABLE 4

| Sample No. | | Overall hardness at room temp., Hv | Overall hardness at 400° C., Hv | Hardness of Cu phase at 400° C., Hv |
| --- | --- | --- | --- | --- |
| Example | 1 | 363 | 302 | (183) |
| | 2 | 358 | 302 | (175) |
| | 3 | 367 | 312 | 168 |
| | 4 | 355 | 288 | 172 |
| | 5 | 298 | 250 | 143 |
| | 6 | 300 | 242 | 130 |
| | 7 | 366 | 310 | 165 |
| | 8 | 362 | 308 | 158 |
| Comp. Ex. | 1 | 210 | 150 | 72 |
| | 2 | 200 | 140 | Free from Cu phase |

Note: The value within ( ) is inaccurate because the Cu phase region was very small.

The overall hardness including the hardness of the Fe phase in addition to the hardness of the Cu phase was measured under a load of 10 kg at room temperature and 400° C. The results are given in Table 5. From Table 5, it is apparent that the alloy of the present invention, also when examined as the whole alloy, is a material having higher high-temperature strength than the comparative material.

TABLE 5

| Sample No. | | Overall hardness at room temp., Hv | Overall hardness at 400° C., Hv | Hardness of Cu phase at 400° C., Hv |
| --- | --- | --- | --- | --- |
| Ex. | 8 | 362 | 308 | 158 |
| | 9 | 385 | 325 | 176 |
| | 10 | 375 | 320 | 170 |

Then, examples of the method for more effectively enhancing the high-temperature strength of the alloy of the present invention will now be described.

At the outset, Example 9 will be described. A mold was prepared by winding a heat insulating material in a sufficient thickness around a sand mold. An alloy of sample No. 8 was prepared in the form of an ingot having a diameter of 200 mm and a height of 300 mm by a melt process in a high-frequency melting furnace. The molten metal was poured into the mold, and a thermocouple, which had been inserted into a ceramic tube, was inserted into the molten metal in its center portion to a depth of 5 cm from the surface of the molten metal, and the surface of the molten metal was covered with a heat insulating material. The solidification initiation temperature was found to be 1450° C. by reading of a change in temperature curve on the latent heat of solidification, and the alloy was gradually cooled from that temperature, i.e., 1450° C., to 500° C. at an average cooling rate of 5° C./min. In Example 10, an ingot having the same composition as the alloy of sample No. 8 was prepared, and the molten metal was heated at 1000° C. for 5 hr and then cooled at a cooling rate of 5° C./min.

Molds (blank molds) prepared from the alloys of Examples 1 to 8 of the present invention and as in Examples 9 and 10 wherein cooling was carried out at controlled cooling rates were used to carry out molding of glass bottles under conditions of a single bottle weight of 610 g, a molding speed of 6 times/min and complete omission of the application of any oil. 48 hr after the initiation of the molding, the molds were observed for surface roughening.

The results are given in Table 6. Criteria of evaluation results given in Table 6 are as follows.

⊚: No change in surface of the mold observed,

○: Surface toughening on pinhole level observed, and

Δ: Surface roughening of about 0.5 to 1 mm observed.

When the molds were evaluated as ⊚, ○ or Δ, the molded bottles were acceptable. On the other hand, for the mold evaluated as X, the molded bottle was unacceptable because surface roughening of not less than 1 mm was observed in several portions.

TABLE 6

| Sample No. | | Surface roughening of mold after use of 48 hours |
| --- | --- | --- |
| Ex. | 1 | ○ |
| | 2 | Δ |
| | 3 | ○ |
| | 4 | ○ |
| | 5 | Δ |
| | 6 | Δ |
| | 7 | ○ |
| | 8 | ○ |
| | 9 | ⊚ |
| | 10 | ⊚ |
| Com. Ex. | 1 | X |
| | 2 | Operation without application of oil impossible |

As is apparent from the results given in Table 6, all the alloys of the present invention caused no significant surface roughening although some variation is found depending upon the molds. Thus, the alloys of the present invention realized the production of bottle products having a good even surface without the application of any oil to the mold.

B. Painting of surface of metal mold

The alloy of the present invention is characterized by self-producing an $Al_2O_3$ film upon heat treatment in an oxidizing atmosphere. In this film, a Cu oxide is formed in a low temperature region in the course of heat treatment and included in the film. The Cu oxide lowers the releasability of the film by glass and is causative of the creation of wrinkle or seam defects in the product. In order to overcome this problem, the present invention is characterized by previously applying, on the surface of the mold used, a coating comprising a highly reductive material composed mainly of an Al powder or a material comprising the Al powder and a substance highly reactive with $Al_2O_3$ at a high temperature and heat-treating the coating in a high-temperature oxidizing atmosphere at a temperature of 700° C. or above to sufficiently diffuse Al, thereby inhibiting the formation of Cu oxide.

The highly reductive material composed mainly of an Al powder refers to a material which covers a Cu—Al—Cr—Ni—Fe alloy and causes self-oxidation during heat treatment to form a protective oxide film that keeps the surface of the alloy reductive at least until the alloy reaches a temperature high enough to sufficiently diffuse Al in the alloy, thus inhibiting the formation of a Cu oxide in a low temperature region.

The substance highly reactive with $Al_2O_3$ refers to a silicic acid compound, a hydroxide, or a carbonic acid compound of at least one metallic element selected from the group consisting of Ca, Mg, Al, Ti, Cr, Fe, Zr and the like, or a composite compound thereof, for example, magnesium silicate hydroxide, chromium silicate hydroxide, vesuvianite (a hydroxide silicic acid compound of Ca, Fe, Mg, and Al), coalingite (a hydrate of a carbonate hydroxide of Mg and Fe), imogolite (a hydrate of a silicate hydroxide of Al), or zoisite (a silicate hydroxide of Ca and Al). These compounds, upon a dehydration reaction or a decomposition reaction at a high temperature, are converted to a substance highly reactive with $Al_2O_3$ and then causes a solid phase reaction with $Al_2O_3$ distributed in an internal oxide layer in the vicinity of the surface of the alloy to produce a reaction product which is absorbed in the surface of the alloy, thereby returning the surface of the alloy to a sound surface.

In practical use, these substances are conveniently in the form of a pigment or paste, containing a vehicle added for facilitating the formation of a coating on the surface of a metal mold, or in the form of a paint containing a solvent added for improving the coatability.

The present invention will now be described in more detail with reference to the following examples and comparative examples.

EXAMPLE B 10 samples were prepared from each of alloys specified in Table 7. Some of them were coated with a paint composed mainly of an aluminum powder and magnesium silicate hydroxide according to the present invention, and, for comparison, the remaining samples were not coated with any paint. The samples were subjected to oxidative heat treatment at 700°° C. for 8 hr.

TABLE 7

| | Chemical composition (wt %) | | | | | |
|---|---|---|---|---|---|---|
| Examples | Cu | Cr | Al | Ni | La + Ce | Fe |
| Alloy 1 | 50 | 12 | 7 | 17 | 0.05 | Balance |
| Alloy 2 | 50 | 12 | 7 | — | 0.05 | Balance |

Figure 6:
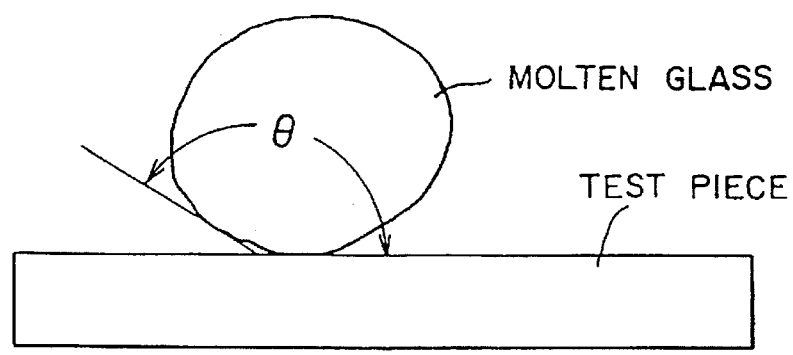
FIG. 6 is an explanatory view showing the measurement of the wetting angle of molten glass.
Figure 8C:
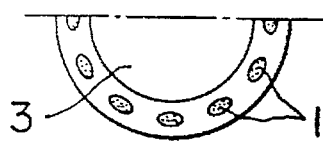
FIG. 8C is a bottom view of a baffle.
Figure 8E:
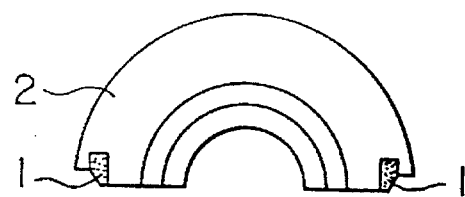
FIG. 8E is a top view of the blank mold.
Figure 8A:
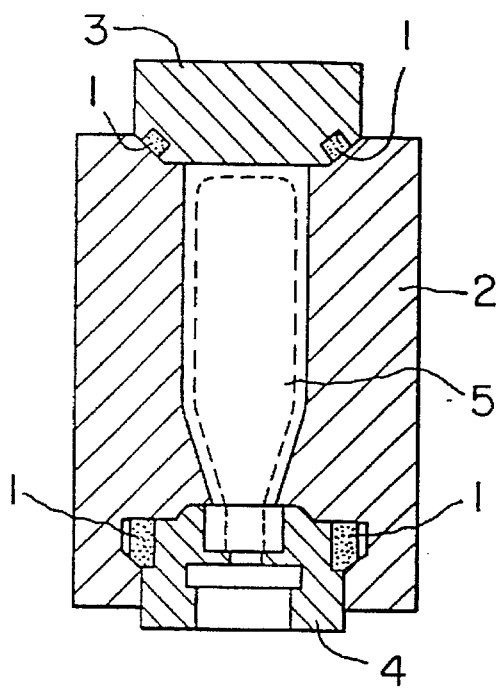
FIG. 8A is a front sectional view.
Figure 8D:
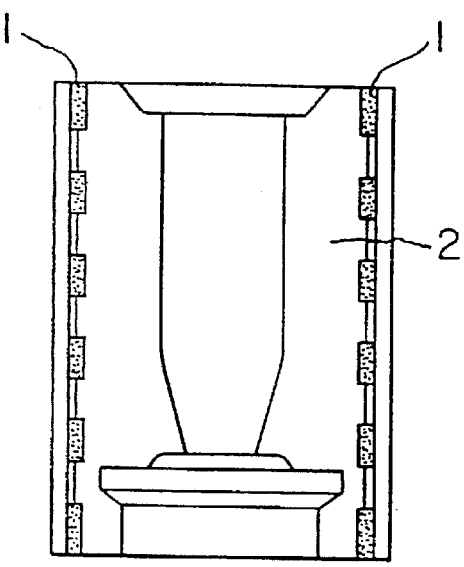
FIG. 8D is a side view of a blank mold.
Figure 8B:
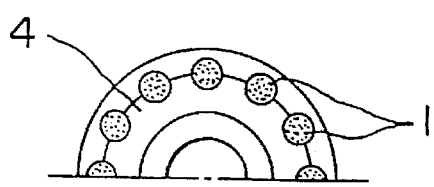
FIG. 8B is a top view of a neck ring.

In order to examine the wettability of these samples by glass, a glass material was put on the surface of each sample, and the angle $\theta$ of wetting of the sample by glass was measured at an atmosphere temperature of 900° C. by a method shown in FIG. 6. The results are given in Table 8. As is apparent from Table 8, the wettability of the sample of the present invention, wherein a paint composed mainly of an aluminum powder and magnesium silicate hydroxide was coated and the residual paint material was removed by grinding, was about 1.2 to 1.5 times better than the comparative example wherein no paint was coated.

TABLE 8

| | | Angle of wetting by glass and proportion of Cu oxide on surface | |
|---|---|---|---|
| | Example | Angle of wetting by glass (°) | Composition of surface (*Percentage area, %) Cu oxide |
| Alloy 1 | Ex. of Inv. | 82 | 3 |
| | Com. Ex. | 103 | 7 |
| Alloy 2 | Ex. of Inv. | 86 | 5 |
| | Com. Ex. | 136 | 11 |

N = 5 for each test (*Percentage area as measured by EPMA image processing)

The results of analysis of elements on the surface of each sample are also given in Table 8. In the examples of the present invention, the amount of Cu oxide is smaller than that in the comparative examples, indicating that the present invention has the effect of inhibiting the formation of Cu oxide.

Then, molds for bottles for drinks which, among various glass products, should have particularly good wettability and are likely to cause wrinkle or seam defects were produced by the above two methods and used to mold bottles in an identical line. As a result, for comparative molds which had not been coated with any paint and had been subjected to heat treatment alone, when a glass material was placed in the mold, it could not smoothly slid into the mold, sporadically causing wrinkle or seam defects. This required the application of a lubricating/swab once per hour. By contrast, the molds of the present invention exhibited good sliding of a glass material thereinto and caused neither wrinkle defect nor seam defect. Further, they did not require the application of a lubricating/swab at all in the course of continuous molding operation for 20 hr and provided glass bottles having satisfactory surface quality and dimension requirements.

In the present example, molds for glass bottles have been described as the glass mold. The present invention, however, is not limited to these only, and the mold of the present invention can be applicable as a glass mold widely to, for example, the production of building materials and tableware, such as a glass, where the mold is used under the same environment as the present example.

C. Roughening of mold surface

The present invention is characterized by roughening the mold surface or providing a hole in the mold surface to reduce the area of contact of the mold surface with glass for the purpose of imparting a heat insulating effect without use of any release agent at the time of oilless molding.

In the production of a glass product using a mold without applying any oil, the glass comes into direct contact with the mold surface, which causes glass to be rapidly cooled, resulting in cracking. This is found that a swab, coated on the mold surface, used in the prior art has not only the effect of improving sliding but also a great heat insulating effect.

The present inventors have aimed at a reduction in the loss of heat from glass with a view to completely avoiding the occurrence of cracking even in the case of operation without the application of any oil and reduced the area of microcontact of glass with the mold surface. Specifically, in the prior art, it was common practice to bring the whole mold surface into contact with glass for cooling the glass as rapidly as possible and to render the mold surface very smooth for good surface appearance of the glass product. By contrast, the present inventors have roughened the mold surface.

Studies conducted by the present inventors have revealed that the surface of glass is not influenced very much by the mold surface and, rather, is greatly influenced by the surface tension of glass and that a reduction in viscosity of glass by lowering the cooling rate provides a product having a good surface appearance.

The mold surface can be toughened by sandblasting, electropolishing, etching and other methods. When the average surface roughness Ra exceeds 0.3 μm, the occurrence of cracking or wrinkle derived from supercooling can be avoided. On the other hand, when Ra exceeds 5 μm, although the occurrence of cracking or wrinkle derived from supercooling can be avoided, the sliding property is deteriorated resulting in occurrence of wrinkle.

Provision of very small holes all over the mold surface is also effective for attaining the same effect. According to experiments conducted by the present inventors, the effect of reducing the cooling can be attained when the percentage area of the very small hole exceeds 30%. However, when the percentage area exceeds 70%, the cooling effect is significantly lowered, causing the shape to become unacceptable. This further incurs an increase in molding cost, which is disadvantageous also from the viewpoint of profitability. The hole diameter is preferably not more than 0.5 mm. This is because when the hole diameter exceeds 0.5 mm, the hole is filled by glass, deteriorating the sliding property. The above method is reliable because quantitative control is possible. Since, however, it results in increased cost, sandblasting or etching is more preferred when control with high precision is unnecessary.

The present invention will now be described in more detail with reference to the following examples and comparative examples.

EXAMPLE C-1

Molds were prepared from a material comprising by weight 20% of Cu, 7% of Al, 5% of Cr, and 0.05% of La with the balance consisting of Fe. Then, one mold was finished with an abrasive paper of #1000 to a surface roughness Ra of 0.1 μm, and other molds were roughened to 1 μm and 5 μm. These molds were compared with one another. They were used to glass forming into an article having such a size as will be likely to cause cracking. The frequency of cracking per 10000 products was examined. The results are given in Table 9.

TABLE 9

| Surface roughness and frequency of cracking | | |
| --- | --- | --- |
| Examples | Surface roughness of mold | Frequency of cracking |
| Ex. 1 of Inv. | 1 μm | 0 |
| Ex. 2 of Inv. | 5 μm | 0 |
| Com. Ex. 1 | 0.1 μm | 16 |

As is apparent from Table 9, when the molds of the present invention having high surface roughnesses of 1 μm and 5 μm were used, no cracking occurred in the products, whereas when the mold having a low surface roughness of 0.1 μm was used, cracking occurred in products.

EXAMPLE C-2

Molds were prepared from a material comprising by weight 20% of Cu, 7% of Al, 5% of Cr, 12% of Ni, and 0.05% of La with the balance consisting of Fe. Then, one mold was finished with an abrasive paper of #1000 to a surface roughness Ra of 0.2 μm, and other molds were roughened to 1 μm and 3 μm. These molds were compared with one another. 50000 products were molded using each of the molds to determine the frequency of cracking. The results are given in Table 10.

TABLE 10

| Surface roughness and frequency of cracking | | |
| --- | --- | --- |
| Examples | Surface roughness of mold | Frequency of cracking |
| Ex. 3 of Inv. | 1 μm | 0 |
| Ex. 4 of Inv. | 3 μm | 0 |
| Com. Ex. 2 | 0.2 μm | 34 |

As is apparent from Table 10, when the molds of the present invention having high surface roughnesses of 1 μm and 3 μm were used, no cracking occurred in the products, whereas when the mold having a low surface roughness of 0.2 μm was used, cracking occurred in products.

EXAMPLE C-3

Molds were prepared from a material comprising by weight 30% of Cu, 7% of Al, 5% of Cr, 12% of Ni, and 0.05% of La with the balance consisting of Fe. The surface roughness was 0.1 μm. Then, holes having a diameter of 0.3 mm were formed so as for the holes to occupy 40% of the mold surface. The mold with no hole provided was used as a comparative mold. 30000 products were molded using each of the molds to determine the frequency of cracking. The results are given in Table 11.

TABLE 11

| Provision of holes and frequency of cracking | | |
| --- | --- | --- |
| Examples | Provision of holes | Frequency of cracking |
| Ex. 5 of Inv. | Provided | 0 |
| Com. Ex. 3 | Not provided | 8 |

As is apparent from Table 11, for the mold with holes provided on the surface thereof, no cracking occurred in the products, whereas for the mold with no hole provided, cracking occurred in products.

D. Lubrication of fitting portion of mold

The present invention is characterized in that a solid lubricating film containing at least one member selected from tungsten disulfide, molybdenum disulfide, boron nitride, and graphite is applied to the fitting portion of a mold or that, instead of the solid lubricating film, a self-lubricating solid is embedded in a recess provided in the fitting portion of a mold.

According to the present invention, the coating of the surface of the contact area between component parts of a mold with a coating agent by dissolving a solid lubricant, such as tungsten disulfide or graphite, in an inorganic binder, such as water glass, followed by heat treatment forms a solid lubricating film, which is very strong and causes neither peeling nor chemical change even after use for a long period of time, enabling the use of the mold for a long period of time without the application of any oil.

The reason why at least one of tungsten disulfide, molybdenum disulfide, boron nitride, and graphite, which are solid lubricants, is selected as the lubricating component is as follows. Conventional lubricating oils and grease are unfavorably evaporated, decomposed, or deteriorated at a service temperature of 200° to 400° C. and, hence, cannot withstand use for a long period of time, whereas the above solid lubricants are stable against heat and are not deteriorated even after use for a long period of time. The inorganic binder, such as water glass, is used as the binder from the viewpoint of adhesion to the mold, chemical stability at a service temperature, and unreactivity with the solid lubricant. FIG. 7 is an explanatory view of an embodiment of the present invention where a solid lubricating film is used.

The self-lubricating solid material used in the present invention is a composite material comprising a dispersion of a solid lubricant, such as tungsten disulfide or molybdenum disulfide, in a metal and should be chemically stable at a service temperature of the mold. The self-lubricating solid material should be evenly disposed so as to cover the whole surface of the contact area between the component parts of the mold. FIG. 8 is an explanatory view of an embodiment where a self-lubricating solid material has been embedded into recesses.

The present invention will now be described in more detail with reference to the following examples and comparative examples.

EXAMPLE D

Examples (D-1 to D-3) and Comparative Examples (D-1 to D-3) of the present invention relating to the prevention of galling are summarized in Table 12.

TABLE 12

| Examples | | Mold material | Application of swab | Bottle forming time to galling | Overall evaluation |
|---|---|---|---|---|---|
| Ex. | D-1 | Cu—Al—Cr—Ni—Fe alloy; solid lubricating film (blank mold) | Not done | Not less than 120 hr (free from galling) | Excellent |
| | D-2 | Cu—Al—Cr—Ni—Fe alloy; solid lubricant embedded (blank mold) | Not done | Not less than 120 hr (free from galling) | Excellent |
| | D-3 | Cast iron; solid lubricant film (blow mold) | Not done | Not less than 120 hr (free from galling) | Excellent |
| Com. Ex. | D-1 | Cu—Al—Cr—Ni—Fe alloy (blank mold) | Not done | About 11 hr | Mold replaced due to galling (molded for about 12 hr) |
| | D-2 | Cast iron (blank mold) | Done | Not less than 60 hr (free from galling) | Mold replaced due to deposition of release agent (molded for about 75 hr) |
| | D-3 | Cast iron (blow mold) | Not done | About 20 hr | Mold replaced due to galling (molded for about 23 hr) |

EXAMPLE D-1

A mold for a small bottle as shown in FIG. 7 is prepared which is made of an alloy comprising by weight 50% of Cu, 12% of Cr, 7% of Al, 17% of Ni, and 0.05% of La+Ce with the balance consisting of Fe (an alloy disclosed in Japanese Patent Laid-Open No. 279944/1994). In this mold, the fitting portion of a blank mold 2, the contact area between the blank mold 2 and a baffle 3, and the contact area between the blank mold 2 and a neck ring 4 are coated with a mixed slurry comprising 60 vol % of tungsten disulfide and 20 vol % of Graphite with the balance consisting of water glass. The resultant coating is dehydrated at 150° C. for 60 min, heated in air to 400° C., and held at that temperature for 60 min to prepare a strong solid lubricating film 1. This mold coated with a solid lubricant was tested for continuous molding of a small bottle 5 without the application of any oil to the mold.

As a result, the contact area was sound after molding of the bottle for about 120 hr, and the mold could be used even after that without problems. Since no swab was deposited onto the bottles, the quality of the bottles was superior to that of bottles prepared by the conventional molding using an oil-based release agent.

EXAMPLE D-2

In the same Cu—Al—Cr—Ni—Fe alloy mold for a small bottle as used in Example D-1, a recess 1 shown in FIG. 8 is formed in the fitting portion of a blank mold 2, the contact area between the blank mold 2 and a baffle 3, and the contact area between the blank mold 2 and a neck ring 4. A 30 vol % tungsten disulfide/30 vol % graphite/40 vol % (Cu-10% Sn-27% Ni) alloy composite sinter was embedded as a self-lubricating solid material in the recess 1 so that the top of the self-lubricating material conforms to the contact area. In order to enhance the retention of the lubricity of the self-lubricating material in the fitting portion between the blank molds 2, the self-lubricating material was placed in both the molds so that the self-lubricating material embedded in one blank mold and the self-lubricating material embedded in the other blank mold were alternately positioned. The mold with the self-lubricating solid material embedded therein was used to carry out a test on continuous molding of a small bottle 5 without the application of any oil to the mold.

As a result, in an early stage of molding operation, the contact of the molds caused the embedded self-lubricating material to be moved and deposited also to the contact area of the mold other than the embedded portions, offering the same solid lubricating film effect as in Example D-1. The contact area was sound after molding of the bottle for about 120 hr, and the mold could be used even after that without problems. Since no swab was deposited onto the bottles, the quality of the bottles was superior to that of bottles prepared by the conventional molding using a oil-based swab.

EXAMPLE D-3

In a cast iron mold for a small bottle shown in FIG. 9, the fitting portion of a blow mold 6 and the contact area between the blow mold 6 and a bottom plate 7 were coated with a mixed slurry comprising 60 vol % of tungsten disulfide and 20 vol % of graphite with the balance consisting of water glass. The resultant coating was dehydrated at 150° C. for 60 min, heated in air to 400° C., and held at that temperature for 60 min to prepare a strong solid lubricating film 1. This mold coated with a solid lubricant was tested for continuous molding of a small bottle without the application of any oil to the mold. As a result, the contact area was sound after molding of the bottle for about 120 hr, and the mold could be used even after that without any problem.

Comparative Example D-1

A test on continuous molding of a small bottle without the application of any oil was carried out using the same Cu—Al—Cr—Ni—Fe alloy blank mold for a small bottle as used in Example D-1 except that no solid lubricant was applied. As a result, about 11 hr after the initiation of molding of bottles, galling occurred in the contact area between the blank mold 2 and the neck ring 4, making it impossible to continue smooth operation with a good dimensional accuracy. The replacement of the mold became necessary at the end of molding of bottles for about 12 hr.

Comparative Example D-2

The conventional cast iron blank mold for a small bottle was used to carry out a test on continuous molding of a small bottle with an oil-based swab applied to the mold.

As a result, even after molding of a bottle for about 60 hr, the contact area between component parts of the mold was sound by virtue of the flow-out of the swab. However, the application of the swab was necessary every 15 to 30 min. Further, due to the deposition of the swab onto the bottles, the quality of the bottles was inferior to that of the bottles prepared in Example D-1 and Example D-2. Continuous molding of bottles required the replacement of the mold about 75 hr after the initiation of the molding due to a remarkable adverse effect of the deposition of the swab on the quality of the bottles.

Comparative Example D-3

The conventional cast iron blow mold wherein no oil-based swab is used in the contact area between the mold and glass was used to carry out a test on continuous molding of a small bottle.

As a result, about 20 hr after the initiation of molding of bottles, galling occurred in the contact area between the blow mold 6 and the bottom plate 7, making it impossible to continue smooth operation with a good dimensional accuracy. The replacement of the mold became necessary at the end of molding of bottles for about 23 hr.

In the present example, molds for glass bottles have been described as the mold for glass. The present invention, however, is not limited to these only, and the mold of the present invention can be applicable as a glass mold widely to, for example, the production of building materials and tableware, such as a glass, where the mold is used under the same environment as the present example.

We claim:

1. An alloy for a glass mold, consisting essentially of by weight Cu: 10 to 80%, Al: 4 to 11%, Cr: 3 to 16%, Ni: 2 to 36%, and at least one rare earth element: 0.02 to 2.0% with the balance consisting of Fe and unavoidable impurity elements.

2. An alloy for a glass mold, consisting essentially of by weight Cu: 10 to 80%, Al: 4 to 11%, Cr: 3 to 16%, Ni: 2 to 36%, at least one rare earth element: 0.02 to 2.0% , and at least one member selected from Ti: Al %×(0.5 to 2), V: Al %×(0.2 to 1), Zr: Al %×(0.1 to 0.3), and Nb: Al %×(0.1 to 0.3) with the balance consisting of Fe and unavoidable impurity elements, a hard phase containing an Al-base intermetallic compound being in a crystallized or precipitated state.

* * * * *